United States Patent [19]
Huang et al.

[11] Patent Number: 5,019,306
[45] Date of Patent: May 28, 1991

[54] HIGH FREQUENCY DIELECTRIC COMPOSITION

[75] Inventors: Rong-Fong Huang; Dean Anderson, both of Albuquerque, N. Mex.

[73] Assignee: Motorola, Inc., Schaumburg, Ill.

[21] Appl. No.: 612,373

[22] Filed: Nov. 14, 1990

Related U.S. Application Data

[62] Division of Ser. No. 458,911, Dec. 29, 1989, Pat. No. 4,992,398.

[51] Int. Cl.$^5$ .............................. C04B 35/46
[52] U.S. Cl. ........................ 264/66; 501/134; 501/136; 264/332
[58] Field of Search ............... 501/134, 135, 136; 264/66, 232

[56] References Cited

FOREIGN PATENT DOCUMENTS 835859 3/1970 Canada .
9041700 12/1979 Japan .

Primary Examiner—William R. Dixon, Jr.
Assistant Examiner—Chris Gallo
Attorney, Agent, or Firm—D. J. Stockley

[57] ABSTRACT

A high-frequency dielectric ceramic compound having a perovskite-type crystal structure comprising a chemical composition substantially represented by the formula $(Sr_xCa_yMn_z)TiO_3$ in which $0.98 < x+y+z < 1.02$, $0.34 < y < 0.4$, and $0.0075 < z < 0.0015$, and possessing a non-linear temperature coefficient is set forth. A method is presented for utilizing the compound to formulate a high-frequency dielectric material, the formulated material being particularly suitable for providing filters and related applications with a relatively low resonant frequency temperature coefficient.

15 Claims, 2 Drawing Sheets

| FREQUENCY (MHz) | TEMPERATURE (°C) | INCREMENTAL $T_f$ (PPM) | PERCENT OF FREQUENCY SHIFT $\frac{FREQ(T)-FREQ(25°C)}{FREQ(25°C)} \times 100$ | | DIELECTRIC CONSTANT $E_r$ |
|---|---|---|---|---|---|
| 357.32 | +68.9 | +0.0 | +.5 | | 243.5 |
| 356.11 | +65.7 | +1070.4 | +.2 | | 245.2 |
| 354.53 | +61.6 | +1092.4 | −.3 | | 247.4 |
| 352.94 | +57.5 | +1099.1 | −.7 | | 249.6 |
| 351.34 | +53.0 | +1001.5 | −1.2 | | 251.9 |
| 349.92 | +48.4 | +885.1 | −1.6 | | 253.9 |
| 348.94 | +43.8 | +607.2 | −1.9 | | 255.4 |
| 349.40 | +37.7 | −213.7 | −1.8 | | 254.7 |
| 352.50 | +32.7 | −1773.1 | −.9 | | 250.2 |
| 355.56 | +27.5 | −1652.0 | −0.0 | | 246.0 |
| 355.57 | +22.6 | −4.0 | +0.0 | COOLING | 245.9 |
| 354.85 | +17.5 | +396.3 | −.2 | | 246.9 |
| 353.69 | +11.4 | +534.9 | −.5 | | 248.6 |
| 352.71 | +6.6 | +580.3 | −.8 | | 249.9 |
| 351.67 | +1.4 | +576.8 | −1.1 | | 251.4 |
| 350.39 | −4.5 | +613.0 | −1.5 | | 253.3 |
| 349.33 | −9.5 | +604.1 | −1.8 | | 254.8 |
| 348.32 | −14.6 | +575.7 | −2.1 | | 256.3 |
| 347.10 | −21.1 | +541.1 | −2.4 | | 258.1 |
| 346.04 | −27.2 | +503.9 | −2.8 | | 259.7 |
| 345.11 | −32.4 | +518.4 | −3.0 | | 261.1 |
| 344.07 | −38.7 | +476.6 | −3.3 | | 262.7 |
| 344.12 | −38.1 | +0.0 | −3.7 | | 262.6 |
| 345.12 | −32.2 | +489.9 | −3.4 | | 261.1 |
| 346.03 | −27.1 | +520.4 | −3.1 | | 259.7 |
| 347.05 | −21.6 | +534.8 | −2.8 | | 258.2 |
| 348.26 | −15.0 | +528.8 | −2.5 | | 256.4 |
| 349.26 | −10.1 | +574.5 | −2.2 | | 254.9 |
| 350.12 | −5.9 | +582.2 | −1.9 | | 253.7 |
| 351.33 | +.1 | +582.0 | −1.6 | | 251.9 |
| 352.59 | +5.4 | +666.8 | −1.2 | | 250.1 |
| 353.69 | +10.4 | +630.4 | −.9 | | 248.6 |
| 354.92 | +15.8 | +646.2 | −.5 | HEATING | 246.8 |
| 355.96 | +20.9 | +568.5 | −.2 | | 245.4 |
| 356.81 | +25.3 | +541.6 | +0.0 | | 244.2 |
| 357.44 | +29.2 | +451.9 | +.2 | | 243.4 |
| 357.67 | +33.3 | +154.4 | +.2 | | 243.1 |
| 355.16 | +39.0 | −1256.0 | −.5 | | 246.5 |
| 352.18 | +44.2 | −1627.1 | −1.3 | | 250.7 |
| 351.50 | +48.9 | −407.4 | −1.5 | | 251.7 |
| 352.21 | +54.1 | +389.1 | −1.3 | | 250.6 |
| 353.65 | +59.0 | +828.8 | −.9 | | 248.6 |
| 355.10 | +63.2 | +983.9 | −.5 | | 246.6 |
| 356.88 | +67.7 | +1090.7 | +0.0 | | 244.1 |

*FIG.1*

HIGH FREQUENCY DIELECTRIC COMPOSITION

This is a division of application Ser. No. 07/458,911, filed 12/29/89, U.S. Pat. No. 4,992,398.

FIELD OF THE INVENTION

This invention relates to a dielectric ceramic composition and a method for manufacturing high-frequency dielectric materials, and more particularly to a dielectric ceramic compound of a perovskite-type crystal structure possessing a non-linear temperature coefficient and a method for manufacturing high-frequency dielectric materials with non-linear temperature coefficients.

BACKGROUND OF THE INVENTION

Generally, high frequency dielectric materials for filters and resonators require a relatively high dielectric constant ($E_r$), a high unloaded dielectric Q, and a low absolute value of a resonant frequency temperature coefficient ($T_f$). Currently, most widely used, commercially available dielectric materials such as $Ba_2Ti_9O_{20}$ and $BaNd_2Ti_5O_{14}$ exhibit $E_r$ values of approximately 37 and 78, respectively, Q values of 15000 and 8000, respectively, and $T_f$ values of 8 ppm/° C. and 40 ppm/° C., respectively. A need exists for smaller filters and resonators, thereby requiring dielectric materials with a higher $E_r$ that simultaneously maintains a relatively low $T_f$.

SUMMARY OF THE INVENTION

These needs and others are substantially met by the present invention, that provides a perovskite-type crystal dielectric ceramic substantially having a $(Sr_xCa_yMn_z)TiO_3$ composition and a method for preparing a perovskite-type crystal dielectric ceramic to selectively obtain a formulation consisting essentially of $(1-m)[(Sr_xCa_yMn_z)TiO_3]+m\ CaTiSiO_5$ and having a relatively high dielectric constant together with a relatively low non-linear temperature coefficient, wherein x, y, z, and m satisfy the following relationships:

$0.98 < x+y+z < 1.02$, $0.34 < y < 0.4$,
$0.0075 < Z < 0.015$, and $0.005 < m < 0.015$.

BRIEF DESCRIPTION OF THE DRAWINGS

FIG. 1 is a table setting forth computations and measurements of the dielectric constant ($E_r$), percent frequency shift, and incremental $T_f$ values for the dielectric ceramic of the present invention.

DETAILED DESCRIPTION OF THE INVENTION

The dielectric ceramic of the present invention is characterized in that it comprises a solid solution of $(Sr_xCa_yMn_z)TiO_3$ wherein $0.98 < x+y+z < 1.02$, $0.34 < y < 0.4$, and $0.0075 < Z < 0.015$, having a perovskite-type crystal structure and possessing a relatively high dielectric constant ($E_r$) greater than 200, a high unloaded dielectric Q at least greater than 1000, and a relatively low absolute value of a resonant frequency temperature coefficient ($T_f$) in the RF range. Due to the hysteritic nature of the non-linear region, the dielectric ceramic of the present invention was characterized on both heating and cooling. The data measurements and computations in Table 1 provide representative values of $T_f$ for the dielectric ceramic of the present invention:

TABLE 1

% Change in Frequency from −35° C. to +85° C. = +5.28
Ave. $T_f$(ppm/°C.) = 440.3
where Freq.$_{max}$ is 363.464 MHz at 85.0° C. on heating
Freq.$_{min}$ is 344.677 MHz at −35.0° C. on cooling
% Change in Frequency from −35° C. to +65° C. = +3.65
Ave. $T_f$(ppm/°C.) = 365.4
where Freq.$_{max}$ is 357.671 MHz at 33.3° C. on heating
Freq.$_{min}$ is 344.677 MHz at −35.0° C. on cooling
% Change in Frequency from −25° C. to +65° C. = +3.16
Ave. $T_f$(ppm/°C.) = 352
where Freq.$_{max}$ is 357.671 MHz at 33.3° C. on heating
Freq.$_{min}$ is 346.417 MHz at −25.0° C. on cooling FIG. 1 sets forth computations and measurements for the dielectric constant ($E_r$), percent frequency shift, and incremental $T_f$ values for the dielectric ceramic of the present invention. It is seen from FIG. 1 that $E_r$ is greater than 200, and percent resonant frequency shifts are lower than 4.0%, corresponding to a $T_f$ value of 400 ppm/° C. Further measurements indicate Q values greater than 1000.

Figure 2:
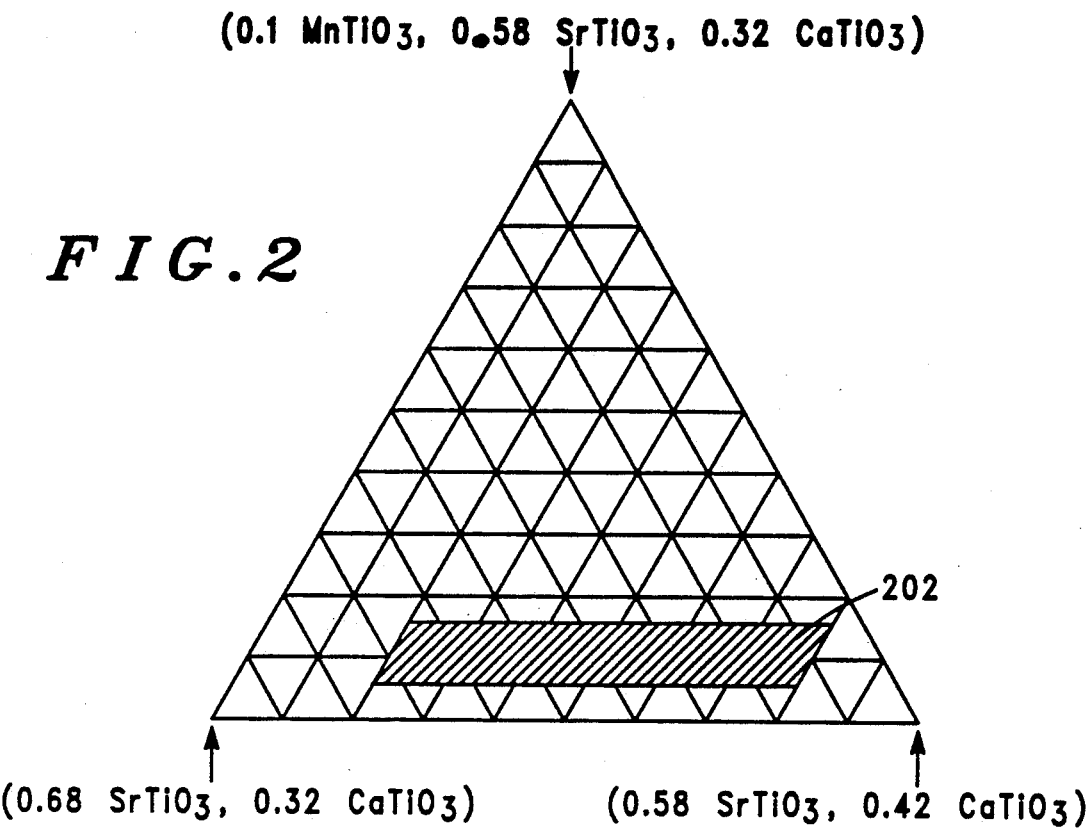
FIG. 2 is a ternary phase diagram substantially depicting a relative range of composition of components of the compound $(Sr_xCa_yMn_z)TiO_3$, the perovskite-type crystal dielectric ceramic set forth in the present invention.

FIG. 2 is a ternary phase diagram showing a relative range of composition (202) of components of the compound $(Sr_xCa_yMn_z)TiO_3$, the perovskite-type crystal dielectric ceramic set forth in the present invention. Addition of manganese causes the non-linear region of the dielectric properties to occur over a broader temperature range.

Table 2 illustrates the resonant frequency of the dielectric ceramic of the material, measured at selected temperatures:

TABLE 2

| Temperature Frequency (°C.) (MHz) | Resonant Frequency On Cooling (MHz) | Resonant On Heating |
|---|---|---|
| −35 | 344.68 | 344.64 |
| −25 | 346.42 | 346.42 |
| −10 | 349.24 | 349.27 |
| +25 | 355.57 | 356.76 |
| +50 | 350.42 | 351.65 |
| +65 | 355.84 | 355.82 |
| +85 | 363.46 | 363.60 |

Figure 3:
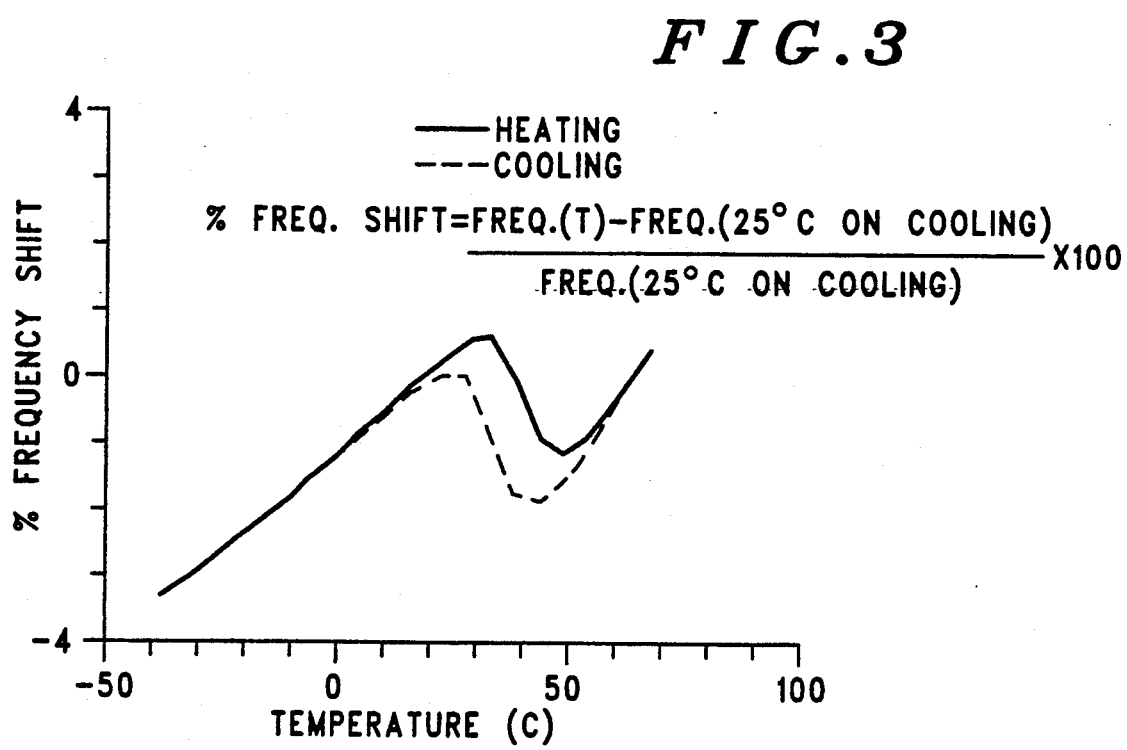
FIG. 3 is a graph showing representative changes in resonant frequency with respect to temperature in degrees Celsius for the dielectric ceramics of this invention.

FIG. 3 is a graph showing resonant frequency shift with respect to temperature in degrees Celsius for the dielectric ceramics of this invention. It can easily be determined that the ratio between the strontium, calcium, and magnesium will decide the temperature at which non-linearity of the resonant frequency versus temperature begins to occur.

The dielectric ceramics of the invention exhibit non-linear temperature coefficients with a significantly lower average $T_f$ than that of presently utilized dielectric ceramics with dielectric constants greater than 200, allowing incorporation of these ceramics in filters and resonators where low $T_f$ is required.

A method for preparing a perovskite-type crystal dielectric ceramic to selectively obtain a formulation consisting essentially of $(1-m)$ $[(Sr_xCa_yMn_z)TiO_3]+m$ CaTiSiO$_5$ and having a relatively high dielectric constant together with a relatively low non-linear temperature coefficient, wherein x, y, z, and m satisfy the following relationships:

$0.98 < x+y+z < 1.02$, $0.34 < y < 0.4$, $0.0075 < z < 0.015$, and $0.005 < m < 0.015$ is initiated by preparing a mixed powder by combining proportions of a strontium compound such as SrCO$_3$ or SrTiO$_3$, a calcium compound such as CaCO$_3$ or CaTiO$_3$, a titanium-oxygen containing compound such as TiO$_2$ if insufficient amounts of titanate compounds are selected in the previous steps, and a manganese compound such as MnCO$_3$, MnTiO$_3$, or manganese nitrate, calculated to produce a compound consisting essentially of $(Sr_xCa_yMn_z)TiO_3$, wherein x, y, and z satisfy the following relationships: $0.98 < x+y+z < 1.02$, $0.34 < y < 0.4$, and $0.0075 < z < 0.015$, mixing the compounds, suitably pulverizing and calcining to obtain the $(Sr_xCa_yMn_z)TiO_3$ compound.

After calcination, the $(Sr_xCa_yMn_z)TiO_3$ is mixed with a suitable amount of a silicon-oxygen containing compound such as CaTiSiO$_5$, CaSiO$_3$, or SiO$_2$ to obtain a formulation $(1-m)$ parts of $(Sr_xCa_yMn_z)TiO_3$ per m parts silicon-oxygen containing compound, wherein m is mole fraction, and such that x, y, z, and m satisfy the following relationships:

$0.98 < x+y+z < 1.02$, $0.34 < y < 0.4$, $0.0075 < Z < 0.015$, and $0.005 < m < 0.015$.

The particle size is reduced, and the material is compressed or tape cast as desired. The material is then sintered for two to eight hours in a temperature range of 1280° C. to 1400° C.

A working example below sets forth a preparation of the composition of the present invention and the method utilizing the invention more specifically:

EXAMPLE

Powders of strontium carbonate, calcium carbonate, titanium dioxide, and manganese titanate all having a purity of at least 99% by weight were used as raw materials. In repeated preparations, these raw material powders were weighed so as to give ceramics having each of the compositions shown by x, y, and z of the general formula $(Sr_xCa_yMn_z)TiO_3$, wherein $0.98 < x+y+z < 1.02$, $0.34 < y < 0.4$, and $0.0075 < z < 0.015$, were then dispersed in a suitable amount of demineralized water and mixed together for approximately four hours. The resulting mixture was dried at approximately 95° C. for four hours, pulverized to a screen size of less than 40 mesh, and calcined at 110°–1200° C. for a period of at least 4 hours for a sample size of approximately 2 kg.

One mole percent of CaTiSiO$_5$ powder having a purity of at least 99% by weight, was combined with 99 mole percent of calcined powder, and the mixture was ball milled to a particle size of approximately one micron. The mixture was dried and pulverized, dry pressed at 10,000–15,000 psi, and sintered at 1280° C. to 1400° C. for four hours.

After the ball milling process, some preparations were combined with binder and plasticizers as is known in the art, and then tape cast and sintered as stated above to form a substrate.

The resultant material may be utilized as a dielectric without further treatment or may be metallized. The relatively low T$_f$, together with the relatively high E$_r$ and Q values, of the resultant dielectric ceramic provides a material particularly suitable for block filter, resonator, and stripline filter applications.

What is claimed is:

1. A method for preparing a perovskite-type crystal dielectric ceramic to selectively obtain a formulation consisting essentially of $(1-m)$ parts $(Sr_xCa_yMn_z)TiO_3$ per m parts silicon-oxygen containing compound and having a relatively high dielectric constant together with a relatively low non-linear temperature coefficient, which comprises:

(A) providing mixed powder composed of a material consisting essentially of $(Sr_xCa_yMn_z)TiO_3$, wherein x, y, and z satisfy the following relationships: $0.98 < x+y+z < 1.02$, $0.34 < y < 0.4$, and $0.0075 < z < 0.015$, by combining suitable proportions of a strontium compound, a calcium compound, a titanium-oxygen containing compound of insufficient amounts of titanate compounds are selected in the previous steps, and a manganese compound to form a mixture, suitably mixing and pulverizing;

(B) calcining by heating said mixed powder to a temperature of 1100° C. to 1200° C. and maintaining that temperature for at least two hours;

(C) mixing the $(Sr_xCa_yMn_z)TiO_3$ with a suitable amount of a silicon-oxygen containing compound such as CaTiSiO$_5$, CaSiO$_3$, or SiO$_2$ to obtain a formulation $(1-m)$ parts of $(Sr_xCa_yMn_z)TiO_3$ per m parts silicon-oxygen containing compound, wherein m is mole fraction, and such that x, y, z, and m satisfy the following relationships: $0.98 < x+y+z < 1.02$, $0.34 < y < 0.4$, $0.0075 < Z < 0.015$, and $0.005 < m < 0.015$;

(D) reducing particle size;
(E) forming and
(F) sintering at a temperature range of 1280° C. to 1400° C. for two to eight hours.

2. A method as recited in claim 1, wherein the strontium compound is selected from the following: SrCO$_3$ and SrTiO$_3$.

3. A method as recited in claim 1, wherein the calcium compound is selected from the following: CaCO$_3$ and CaTiO$_3$.

4. A method as recited in claim 1, wherein the titanium-oxygen compound is TiO$_2$.

5. A method as recited in claim 1, wherein the manganese compound is selected from the following: MnCO$_3$, MnTiO$_3$, and manganese nitrate.

6. A method as recited in claim 1, wherein combination of the selected compounds to form a mixture and suitably pulverizing is accomplished by dispersing the compounds in suitable amounts of demineralized water, mixing, drying and pulverizing to desired particle size.

7. A method as recited in claim 1, wherein combination of the selected compounds to form a mixture and suitably pulverizing is accomplished by mixing the dry compounds and pulverizing to desired particle size.

8. A method as recited in claim 1, wherein the silicon-oxygen containing compound is selected from: CaTiSiO$_5$, CaSiO$_3$, and SiO$_2$.

9. A method as recited in claim 1, wherein a suitable amount of the silicon-oxygen containing compound is one mole percent of CaTiSiO$_5$ per 99 mole percent of powder from the calcination step.

10. A method as recited in claim 1, wherein the reduced particle size is substantially one micron.

11. A method as recited in claim 1, wherein the forming step is carried out with a compression of at least 10,000 pounds per square inch.

12. A method as recited in claim 1, wherein the forming step is carried out with a compression of the order of 10,000 to 15,000 pounds per square inch.

13. A method as recited in claim 1, wherein the prepared dielectric ceramic exhibits a dielectric constant $E_r$ of greater than 200.

14. A method as recited in claim 1, wherein the prepared dielectric ceramic exhibits a dielectric Q of greater than 1000.

15. A method as recited in claim 1, wherein the prepared dielectric ceramic exhibits an average resonant frequency temperature coefficient $T_f$ of less than 400 ppm/° C. for the temperature range −35° C. to +65° C.

* * * * *

UNITED STATES PATENT AND TRADEMARK OFFICE
CERTIFICATE OF CORRECTION

PATENT NO. : 5,019,306
DATED : May 28, 1991
INVENTOR(S) : Rong-Fong Huang; Dean Anderson It is certified that error appears in the above-identified patent and that said Letters Patent is hereby corrected as shown below:

In the claims:

At column 4, line 4, "perovskite-type crystal" should be --perovskite crystal--.

At column 4, line 17, "compound of" should be --compound if--.

At column 4, line 35, "(E) forming and" should be --(E) forming; and--.

Signed and Sealed this

Thirtieth Day of November, 1993

Attest:

BRUCE LEHMAN

*Attesting Officer*      *Commissioner of Patents and Trademarks*